United States Patent
Staver

(10) Patent No.: US 6,800,045 B1
(45) Date of Patent: Oct. 5, 2004

(54) AUTOMATIC GEAR RATIO REDUCTION SYSTEM

(76) Inventor: Blaine Staver, 572 Snyder Rd., Cogan Station, PA (US) 17728

( * ) Notice: Subject to any disclaimer, the term of this patent is extended or adjusted under 35 U.S.C. 154(b) by 0 days.

(21) Appl. No.: 10/617,417

(22) Filed: Jul. 10, 2003

(51) Int. Cl.$^7$ ............................................... F16H 47/08
(52) U.S. Cl. ........................................................ 475/104
(58) Field of Search .................................. 475/104, 102

(56) References Cited

U.S. PATENT DOCUMENTS

| | | | |
|---|---|---|---|
| 1,859,347 A | * 5/1932 | Michael | 475/104 |
| 2,330,375 A | * 9/1943 | Orner | 475/96 |
| 4,627,312 A | 12/1986 | Fujieda et al. | 74/866 |
| 4,868,753 A | 9/1989 | Mori | 364/424.1 |
| 5,150,297 A | 9/1992 | Daubenmier et al. | 364/424.1 |
| 5,645,506 A | * 7/1997 | Mleczko | 475/257 |

* cited by examiner

*Primary Examiner*—Dirk Wright
(74) *Attorney, Agent, or Firm*—Goldstein Law Offices, P.C.

(57) ABSTRACT

A system for automatically lowering an effective gear ratio between an input gear, driven by a rotary power source, and an output gear that drives a driven load. A variance gear is interposed coaxially between the input gear and output gear. The input gear normally drives the output gear through an upper motion transfer gear, an upper variance gear, a lower variance gear, and a lower motion transfer gear. When resistance to rotation is presented to the output gear the upper and lower variance gear begin planetary motion around the lower motion transfer gear, rotate the lower motion transfer gear and output gear more slowly, and thereby lower the effective gear ratio between the input and output gears.

8 Claims, 6 Drawing Sheets

AUTOMATIC GEAR RATIO REDUCTION SYSTEM

BACKGROUND OF THE INVENTION

The invention relates to an automatic gear ratio reduction system. In particular, the invention relates to a system that automatically adjusts a gear ratio between a drive source and a driven load sufficiently to maintain rotation of the driven load, in accordance with the resistance to rotation presented by the load.

A rotary power source, such as a motor, is generally not coupled directly with a load. Typically the motor has an operating rotational speed and torque. It is rare that this rotational speed is directly matched with the requirements of the load. For a given power, rotational speed and torque are inversely proportional. Thus, Accordingly, various transmission systems are employed to either reduce or increase the ratio between speed and torque to achieve a compromise, which best suits the load.

Many applications, however, will vary the torque/rotational speed requirements under different operating conditions. For example, an automobile initially begins motion with low rotational speed of the tires, but supplies high torque to the tires that allows the automobile to accelerate to a higher speed of travel. When the automobile reaches its cruising speed, the tires must be rotated at a higher speed, while less torque is necessary to accelerate the automobile. Accordingly, automobile transmissions have several gear ratios. The lowest gears are suitable for lower travel speeds and for a greater ability to accelerate, while the highest gears are suitable for cruising at higher speeds while keeping the engine within its designed range of rotational speed. Naturally, less torque and thereby less ability to accelerate is available when using the highest gears. Generally, automobiles have three to six fixed gear ratios between the engine and the 'final drive'. Picking one of the gear ratios requires 'shifting gears', either manually, or through an automatic mechanism.

In addition, common power tools undergo a similar battle for torque and rotational speed. A drill, for example, will commonly rotate at a high speed while it travels with little resistance through a workpiece. At times, however, the drill bit will encounter considerable resistance, which has a tendency to stall the drill. A stalled electric drill motor will draw considerable current, may overheat, and will shorten the useful life of the motor. Ordinarily, a drill stall causes the worker to halt working to prevent damaging the drill.

Various transmissions have been proposed which seek to allow the gear ratio to be altered continuously. So-called 'continuously variable transmissions' supposedly allow infinite gear ratios to be achieved within a range. Such systems however, generally rely on belts, selective friction, and slippage, which thereby greatly decrease their efficiency and useful life.

While these units may be suitable for the particular purpose employed, or for general use, they would not be as suitable for the purposes of the present invention as disclosed hereafter.

SUMMARY OF THE INVENTION

It is an object of the invention to provide a gear ratio adjustment system that automatically adjusts the gearing ratio to achieve the necessary torque to maintain rotational motion at the load. Accordingly, the system reacts in response to increased resistance at the load to lower the gear ratio, increase the torque at the load, and thereby maintain motion.

It is another object of the invention to provide a gear ratio adjustment system which substantially operates using gears in mesh, and does not require 'shifting of gears' or otherwise altering the arrangement of gears in mesh to achieve different gear ratios. Accordingly, the system effectively lowers the gear ratio while all gears remain in mesh.

It is a further object of the invention to provide a gear ratio adjustment system, which quickly adapts to changes in resistance upon the output gear, without stopping motion. Accordingly, the configuration of gears according to the present invention according to a primary embodiment employs an input/output gear set that allows the gear ratio to be lowered by the automatic commencement of planetary motion of the lower variance determining gear around the lower motion transfer gear mounted radially off center on a variance gear coaxial with the input and output gears, to compensate for the increased resistance at the output gear, wherein the lower variance gear is in part rotating the output gear through the lower motion transfer gear and in part orbiting around the lower motion transfer gear.

It is yet a further object of the invention to provide a gear ratio adjustment system, which allows continuous gear ratios to be achieved. Accordingly, the amount of resistance presented to the output gear will vary the degree to which the lower variance determining gear directly turns the lower motion transfer gear and the degree to which the lower variance determining gear revolves around the lower motion transfer gear. The partial direct rotation of the lower variance determining gear and revolution around the lower motion transfer gear by the lower variance determining gear will depend on the amount of resistance and will thereby achieve a 'comfortable' gear ratio by which rotation may continue.

It is a still further object of the invention to help ensure that the lower gear ratio associated with planetary motion only occurs when the resistance to rotation renders it necessary to lower the gear ratio. Accordingly, pressure can be applied to the variance gear of the input/output gear set to help ensure to increase the resistance necessary to begin lowering the effective gear ratio between the input and output gear set.

It is yet another object of the invention to provide a feedback loop which automatically increases the range of gear ratios achievable by the system. Accordingly, a variance control gear set is provided which is a substantial clone of the input/output gear set, except wherein the input gear is known as a speed gear which is driven by the output gear of the input/output gear set; and the output gear is a control gear which drives the variance gear of the input/output gear set.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

FIGS. 1–5 illustrate a first embodiment of the automatic gear reduction system according to the present invention 10. In particular, an input/output gear set 20 is illustrated. The input/output gear set 20 can function as a stand-alone embodiment of the invention, or can be used as a building block in a further embodiment of the invention, described below, wherein further feedback is implemented to more efficiently control the automatic gear reduction of the input/output gear set 20—which will be described in further detail below.

For the purpose of the following discussion, "shaft drives" or "shaft driven" means that two components are mounted on the same axis and linked by a shaft therebetween so that both components rotate together. Further "mesh drives" or "mesh driven" means that two components are tangentially engaged at their respective circumferences either frictionally or with gear teeth so that they rotate together.

Figure 1:
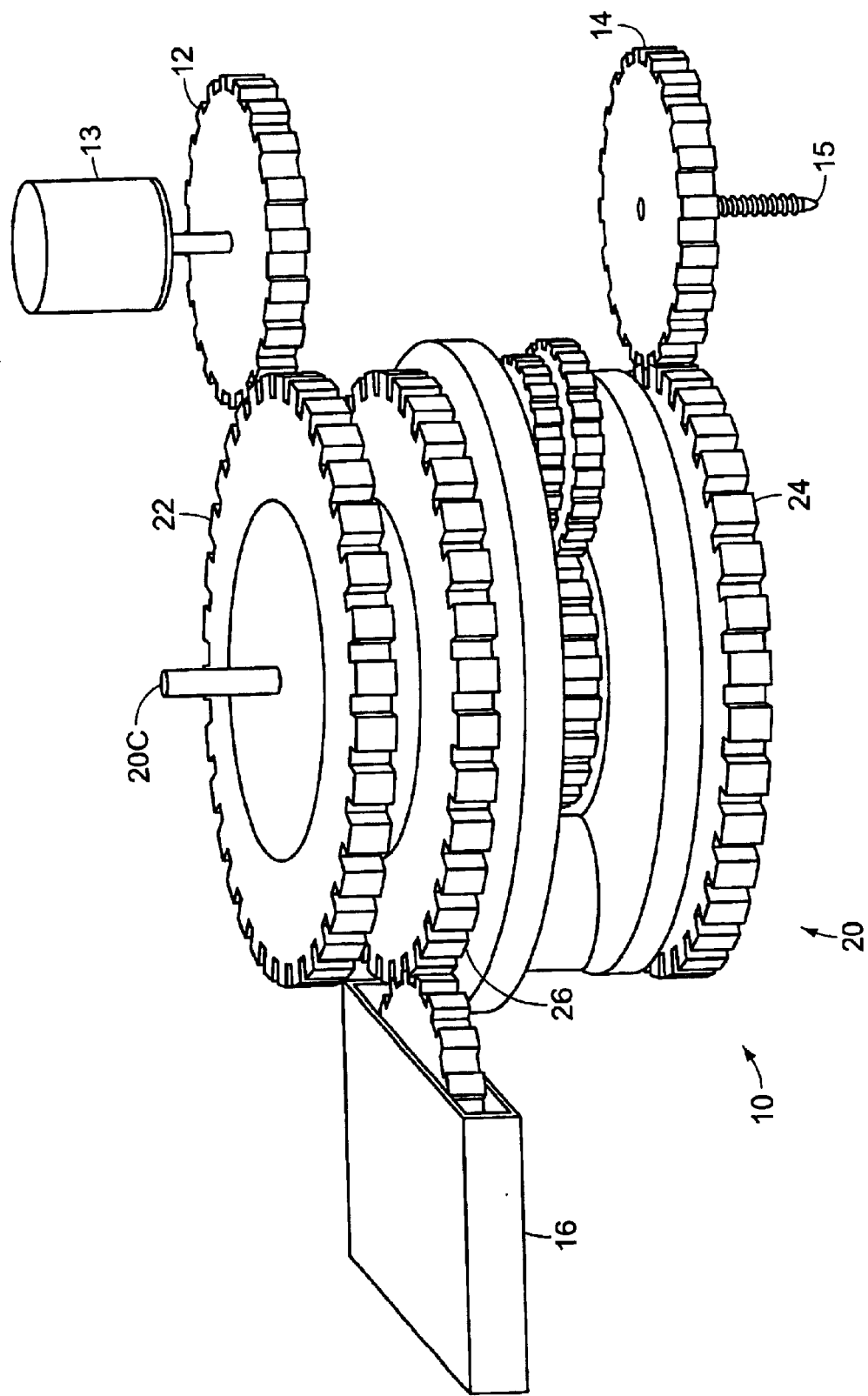
FIG. 1 is a diagrammatic perspective view, illustrating a first embodiment of the invention, namely having an input/output gear set, a drive source and a driven load, and an auxiliary variance control gear.

Referring to FIG. 1, the input/output gear set 20 has a central axis 20C, and has an input gear 22 and output gear 24 coaxially mounted on the central axis 20C but not connected thereon. The central axis 20C contains a series of shafts and bearings, such that various gears and spacers coaxially mounted on the central axis do not rotate together. With the interconnection and lack of connection of the gears described in detail hereinbelow, specific details regarding the shafts, bearings, and spacers for mounting of such gears is well within the knowledge of those skilled in the art—yet is to a large extent illustrated in the drawing figures. Accordingly, full details regarding the same are beyond the scope of this discussion.

The input gear 22 is driven by a rotary drive power source 12, which includes a motor 13, and the output gear 24 drives a load 14, which by example herein includes a drill bit 15. In typical fixed gearing arrangements, the torque supplied to the output gear 24, and thus the load 14 is fixed. As will be illustrated herein, however, additional torque will be supplied, by lowering the effective gear ratio between the input gear 22 and output gear 24 when resistance to the output gear 24 from the load 14 would otherwise stall the output gear 24, and thus the input gear 22 and rotary drive power source 12. A variance gear 26 forms a part of the input/output gear set 20, and allows control over conditions under which the input/output gear set 20 lower the gear ratio between the input 22 and output gear 24. The variance gear 26 can be controlled by a variance gear control 16, which is diagrammatically illustrated in FIG. 1, and will be the subject of further discussion and further examples subsequent to the complete discussion of the input/output gear set 20.

Figure 2:
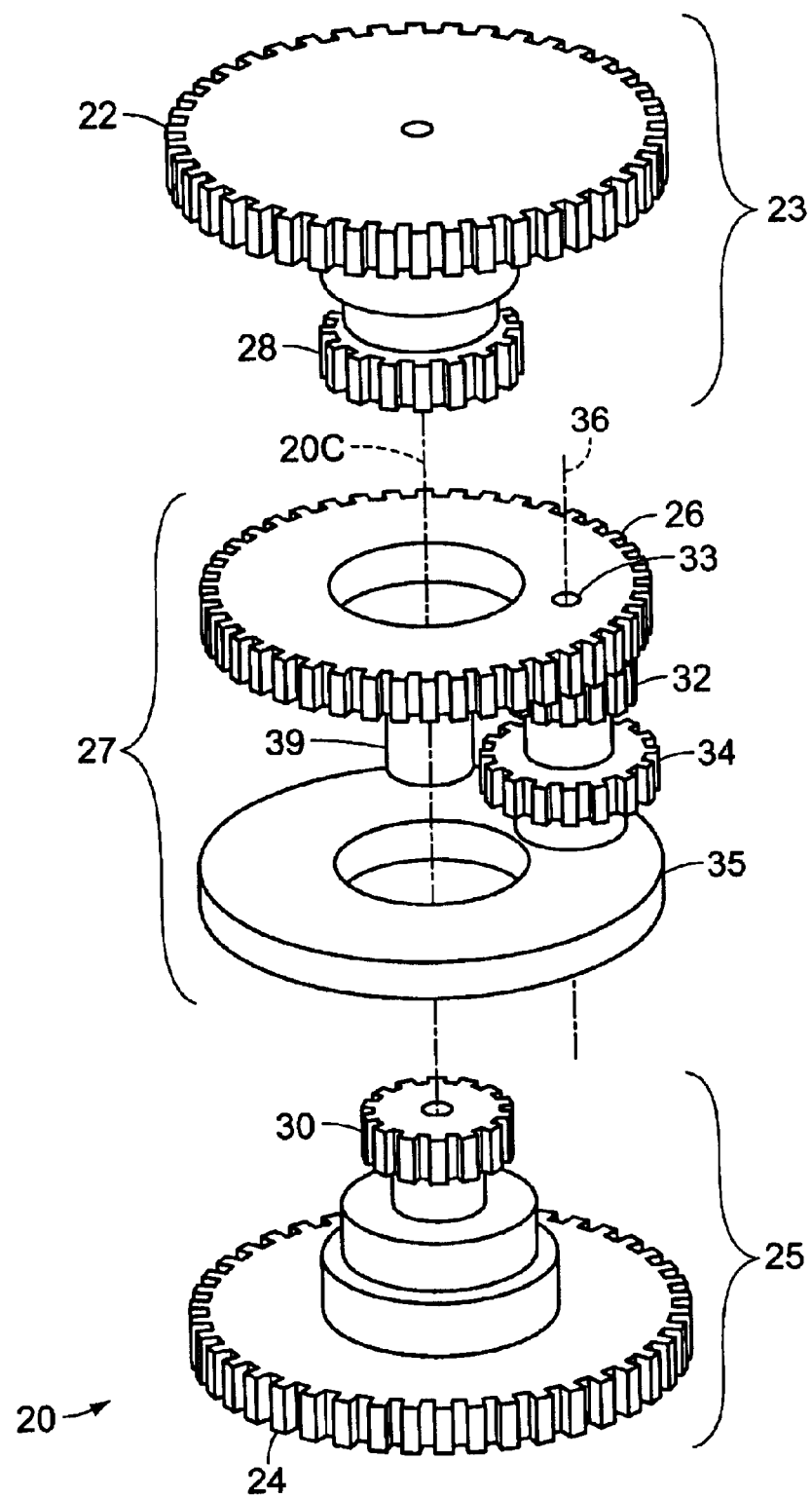
FIG. 2 is an exploded perspective view of the input/output gear set, having an input gear set, an output gear set, and a middle motion transfer assembly therebetween.

FIG. 2 illustrates ganging of various gears of the input/output gear set 20. In particular, an input gear assembly 23 includes the input gear 22 and upper motion transfer gear 28, which are both coaxial with the central axis 20C and mechanically ganged such that the upper motion transfer gear 28 is shaft driven by the input gear 22. An output gear assembly 25 includes the output gear 24 and a lower motion transfer gear 30, which are both coaxial with the central axis 20C and mechanically ganged such that the output gear 24 is shaft driven by the lower motion transfer gear. Accordingly, the input gear assembly 23 and output gear assembly 25 are coaxial on the central axis 20C, but are not mechanically ganged, and thus do not rotate together.

A middle motion transfer assembly 27 includes the variance gear 26, a upper variance determining gear 32, a lower determining variance gear 34, and a xx plate 35. The variance gear 26 and the xx plate 35 are coaxially mounted on the central axis 20C with the input gear assembly 23 and output gear assembly 25. The upper variance determining gear 32 and lower variance determining gear 34 are located on a variance determining gear axis 36 that is not coaxial with the input gear assembly 23 and output gear assembly 25 but is located radially outward on the variance gear 26 on a variance determining gear shaft 33. In particular, the variance determining gear shaft 33 extends between the variance gear 26 and the xx plate, parallel to the central axis 20C. The upper variance gear 32 and lower variance gear 34 are coaxial with each other and are ganged for rotation together on the variance determining gear axis 36 with the variance determining gear shaft 33. The variance gear 26 and the xx plate 35 are further connected by a post 39 extending parallel to the central axis 20C to stabilize the middle motion transfer assembly 27 into a single 'piece' that can selectively rotate together around the central axis 20C although during typical operation the variance gear 26 remains stationary.

Figure 3:
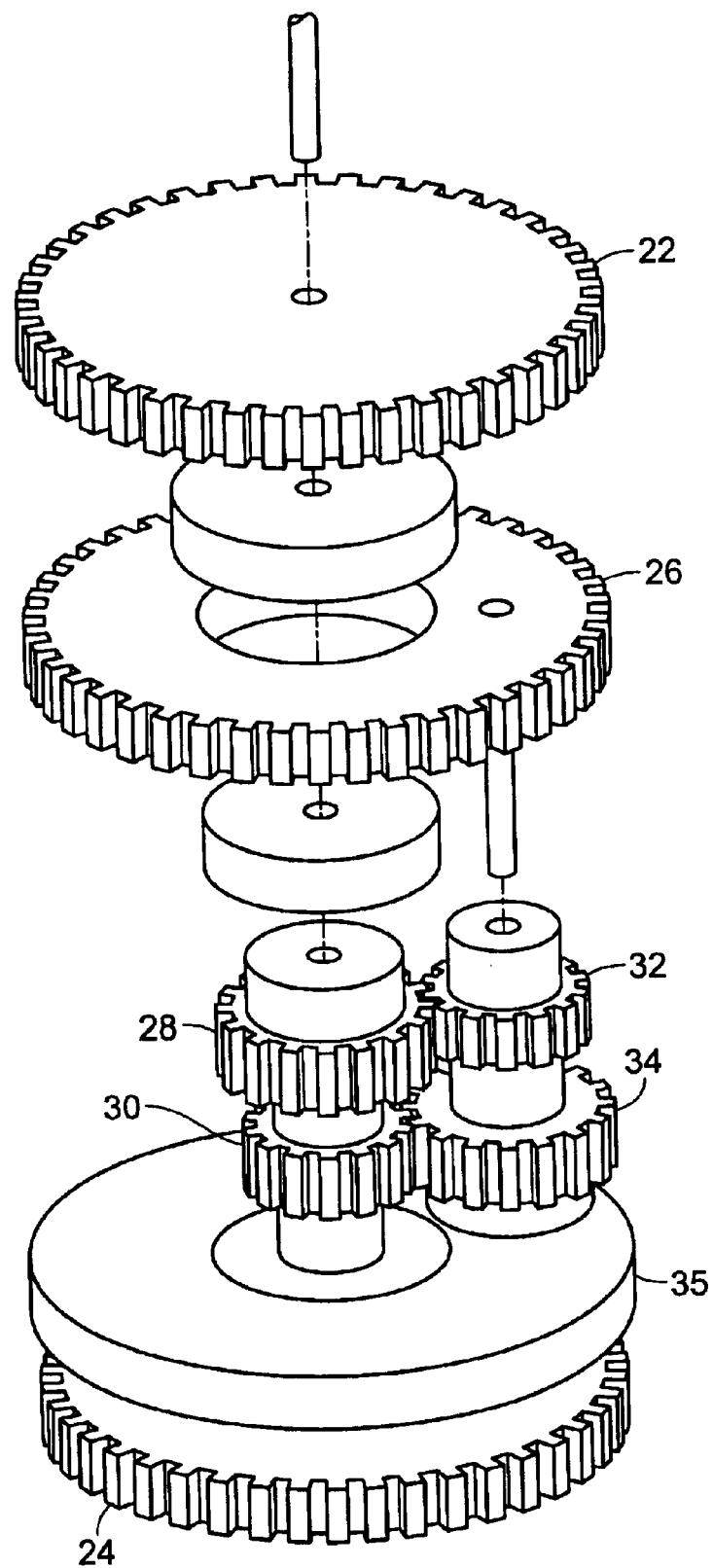
FIG. 3 is an exploded view of the input/output gear set, illustrating the interconnection of the middle motion transfer assembly with the upper motion transfer gear and lower motion transfer gear.

Now, referring to FIG. 3, the upper motion transfer gear 28 is in mesh with the upper variance determining gear 32, and the lower variance determining gear 34 is in mesh with the lower motion transfer gear 30. However, the upper motion transfer gear 28 and lower motion transfer gear 30 are not mechanically linked such that they do directly drive each other or rotate together. Accordingly, during typical operation, the input gear 22 shaft drives the upper motion transfer gear 28, the upper motion transfer gear 28 mesh drives the upper variance determining gear 32; the upper variance determining gear 32 shaft drives the lower variance determining gear 34; the lower variance gear 34 mesh drives the lower motion transfer gear; and the lower motion transfer gear 30 shaft drives the output gear 24.

Figure 4:
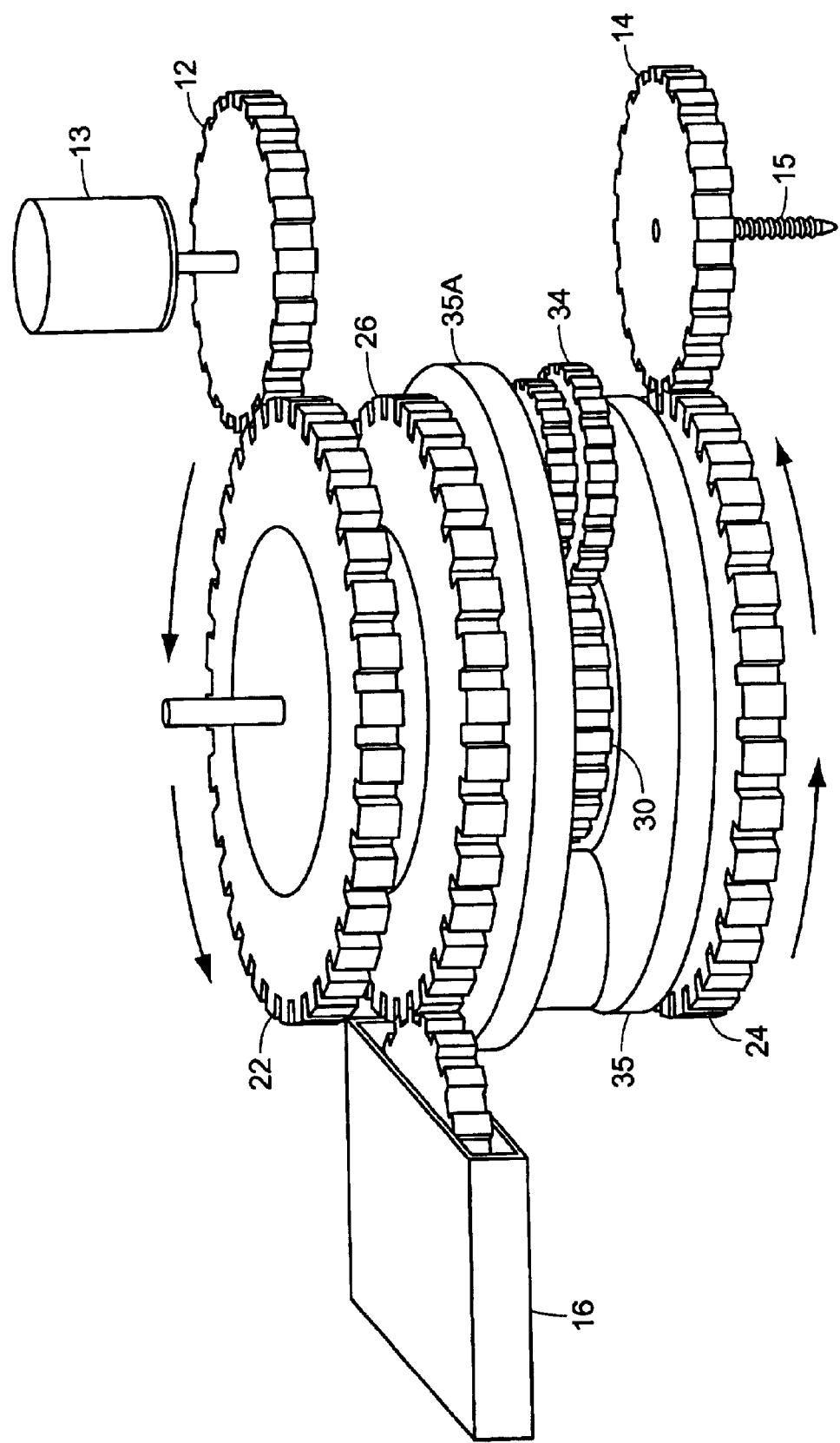
FIG. 4 is a diagrammatic perspective view, illustrating thee invention in use, during typical operation such that the lower motion transfer gear is rotated by the lower variance determining gear, and wherein the variance gear is substantially stationary.

FIG. 4 illustrates the assembled device 10 during typical operation. Note that an additional transfer plate 35A, omitted for clarity in FIG. 2 and FIG. 3, is mounted substantially parallel with transfer plate 35, immediately beneath the variance gear 26 to stabilize the middle motion transport assembly 27, and similarly rotates therewith.

During such typical operation, the input gear 22 and output gear 24 rotate in the same direction, the drive source 12 rotates the input gear 22, the lower variance determining gear 34 rotates the lower motion transfer gear 30 to rotate the output gear 24 and thereby rotate driven load 14. Accordingly, the output gear 24 is rotated at a relatively high rate of speed and there is a relatively high gear ratio between the input gear 22 and output gear 24. During such typical operation, the variance gear 26 and plate 35 is substantially stationary as motion of the lower variance determining gear 34 is substantially transferred to the lower motion transfer gear 30 through direct meshed rotation.

Figure 5:
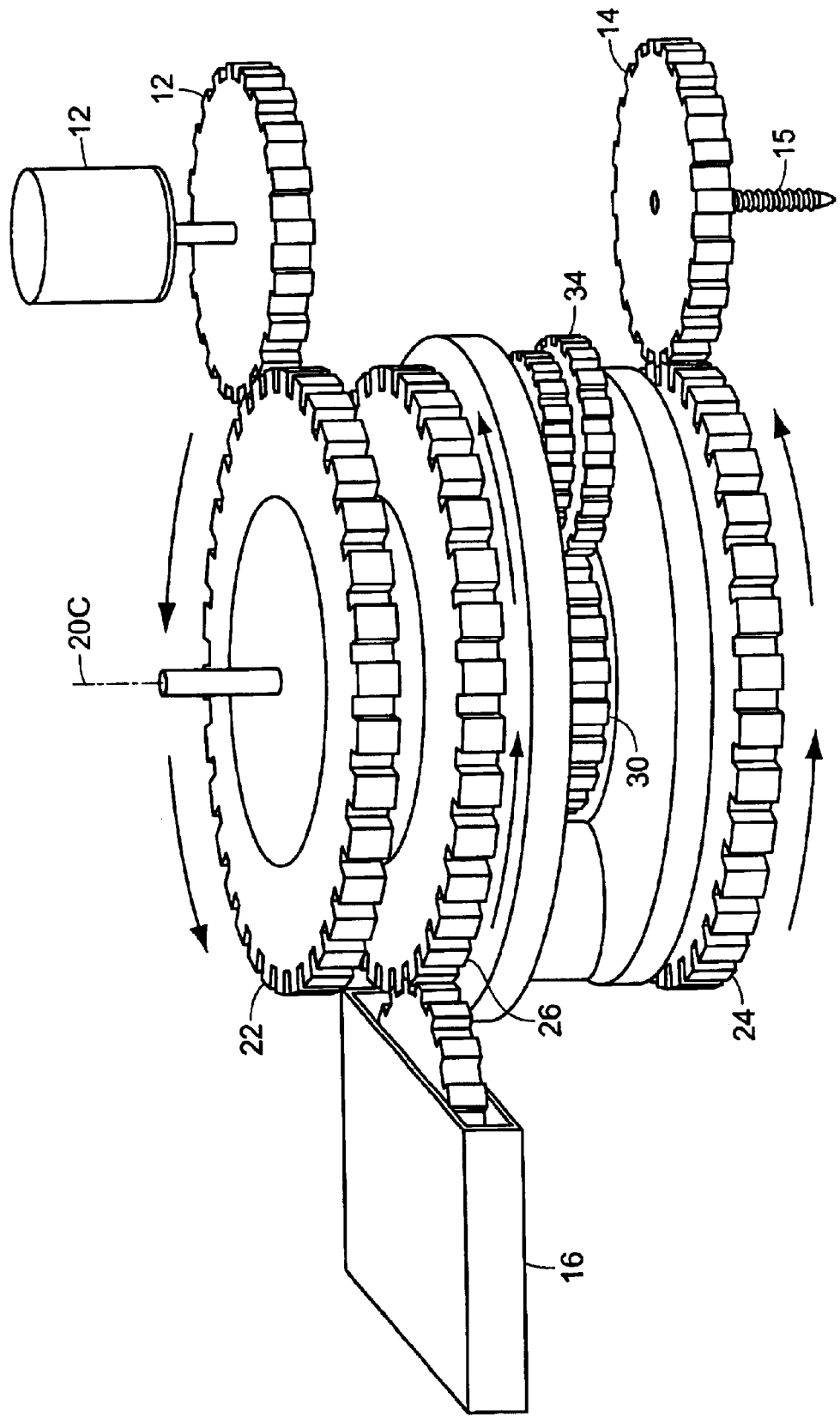
FIG. 5 is a diagrammatic perspective view, similar to FIG. 4, except wherein the driven load has encountered significant resistance to rotation and wherein the middle motion transfer assembly has begun planetary motion such that the lower variance determining gear is revolving around the lower motion transfer gear to maintain motion of the output gear while the middle motion transfer assembly—including the variance gear—begins rotating in the same direction as the input and output gears.

Referring to FIG. 5, however, when resistance is placed on the output gear 24 by the driven load 14, tension occurs at the interface of the lower motion transfer gear 30 and lower variance determining gear 34, which causes the lower variance determining gear 34 to revolve or orbit around the lower motion transfer gear 39, causing the variance gear 26 to rotate, such that the variance gear axis 36 rotates around the central axis 20C (in the same direction as the input gear 22 and output gear 24). At this point, motion of the lower variance determining gear will be partially translated to direct rotation of the lower motion transfer gear, albeit with greater leverage due to rotation around the central axis 20C; and partially translated to orbital motion around the lower motion transfer gear 30. Accordingly, the input gear will continue rotating, and the drive source 13 will not be unduly taxed. In addition, to the extent possible, the lower motion transfer gear 30 and thus the output gear 24 will still rotate—although at a lower speed but with greater torque being delivered to the driven load 14. An equilibrium point (speed) will be reached by which the lower variance determining gear 34 rotates the output gear 24 to the extent possible, and revolves around the lower motion transfer gear 30 as well. Accordingly, a input gear 22 to output gear 24 overall gear ratio will be achieved at which motion of the output gear 24 will continue.

Accordingly, as the resistance is increased, the motion of the variance gear axis 36 around the central axis 20C will increase. This is because the upper and lower variance gears 32, 34 are on a common axis and must rotate together, yet the upper motion transfer gear 28 (see FIG. 3) are also in mesh but are at different but complementary gear ratios so that the lower variance gear 34 will begin revolving around the lower motion transfer gear 30 to maintain rotation.

To facilitate the actual reduction in gear ratio, rather than a simple planetary cavitation of the lower variance determining gear 34 around the output gear, the ratio between the upper motion transfer gear 28 and upper variance determining gear 32 is preferably equal to the ratio between the lower variance determining gear 34 and the lower motion transfer gear 30. See FIG. 3, where the motion transfer gears 28, 30 and the variance determining gears 32 and 34 are clearly "reversed"—i.e. large upper motion transfer gear 28 and lower variance determining gear 34, and small lower motion transfer gear 30 and upper variance determining gear 32. This relationship helps the input/output gear set 20 "find" an equilibrium overall gear ratio to help maximize the maintenance of speed at the output gear 24 when encountering resistance thereat.

Naturally when the middle motion transfer assembly 27 is in planetary motion, the lower motion transfer gear 30 will rotate more slowly—subtracting the planetary motion of the lower variance gear therearound. The input gear 22 will continue to rotate at the same speed—however by virtue of the planetary motion, lower speed and greater torque will be imparted to the lower motion transfer gear 30, and thus the output gear 24. Accordingly, a lower gear ratio between the input gear 22 and output gear 24 will be automatically achieved upon the output gear 24 encountering sufficient resistance.

Figure 6:
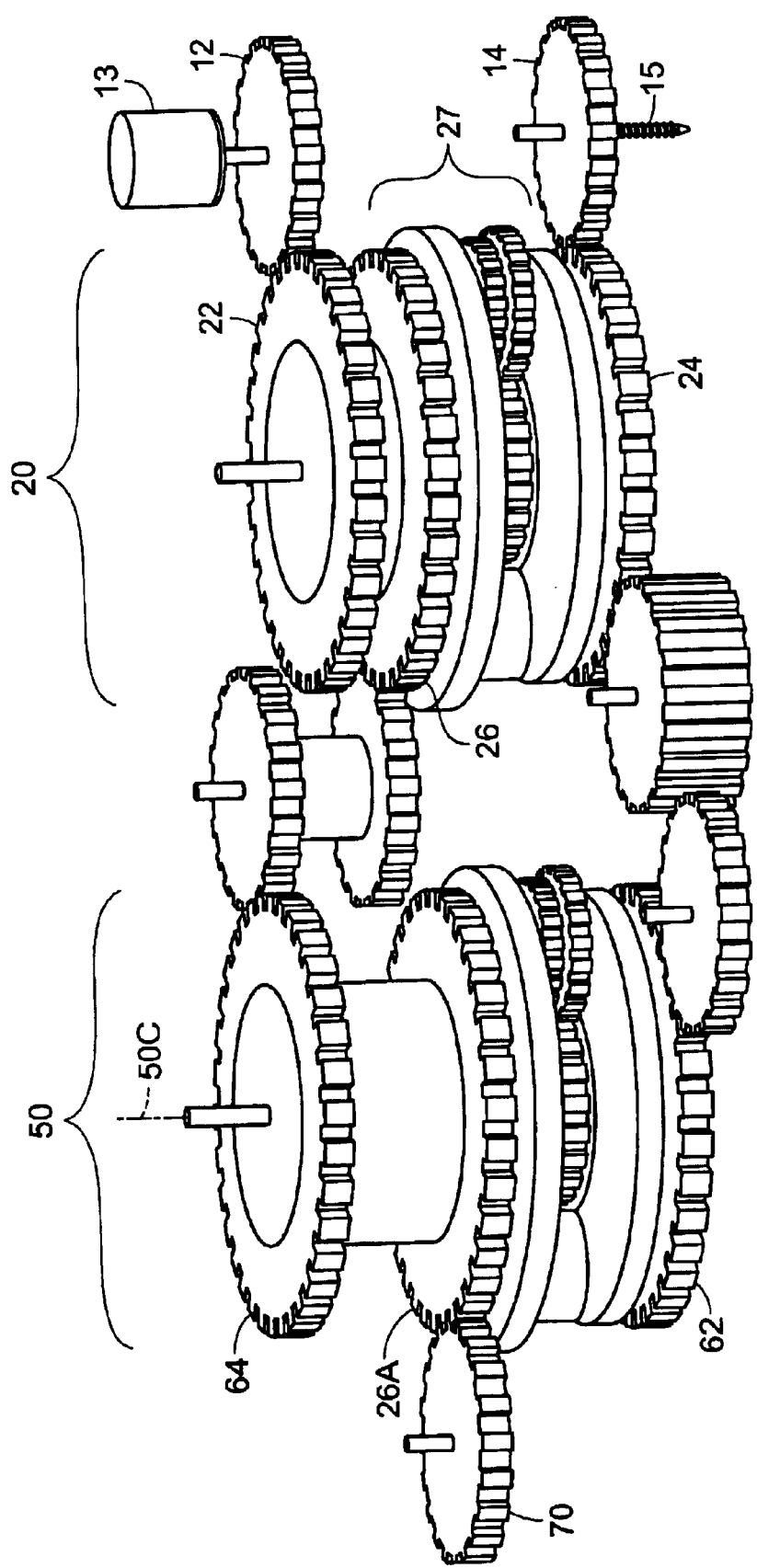
FIG. 6 is a diagrammatic perspective view of a further embodiment of the invention, wherein a variance control gear set is provided, which is substantially identical to the input/output gear set and provides a feedback loop to adjust the sensitivity of the output gear to initiating planetary motion when resistance is encountered at the output gear.

The magnitude of the "sufficient resistance" necessary to begin such planetary motion can be further controlled with the variance gear, by giving it a tendency against planetary motion. This can be accomplished by restraining the variance gear 26 with the auxiliary variance gear control assembly 16 shown in FIGS. 1–5, or by actually rotating the variance gear 26 in the opposite direction as the input gear 22 and output gear 24. Restraint of the variance gear 26 can be accomplished with magnetism, friction, or any other means well known to those skilled in the art. In addition, a feedback loop can be established to help maximize the efficiency of the device 10 by maximizing the speed achievable at a given resistance. Such can be achieved by externally rotating the variance gear can be accomplished with a variance control gear set 50, illustrated in FIG. 6.

In particular, the variance control gear set 50 which is analogous in structure to the input/output gear set 20, such that the variance control gear set 50 has a substantially identical structure as the input/output gear set 20 except that its components are spaced along its central axis 50C in a slightly different manner, and the variance control gear set 50 herein is illustrated upside down for convenience of appropriate interconnection with the input/output gear set 20. Regarding nomenclature, the variance control gear set 50 has a speed gear 62 which is analogous to the input gear 22 of the input/output gear set 20, and it has a variance control gear 64 which is analogous to the output gear 24 of the input/output gear set 20.

The variance control gear set 50 effectively provides a feedback loop between the output gear 24 and variance gear 26 of the input/output gear set 20. Accordingly, the speed gear 62 of the variance control gear set 50 is connected to be rotate with the output gear 24 of the input/output gear set 20; and the variance control gear 64 connected to rotate the variance gear 26 of the input/output gear set. The result is that the output gear 24 rotates the speed gear 62. The speed gear 62 causes the variance control gear 64 to following the same principles by which both the input gear 22 and output gear 24 of the input/output gear set rotate together. The variance control gear 64 attempts to rotate the variance gear 26 of the input/output gear set 20 in the opposite direction as its input gear 22 and output gear 24. Accordingly, the middle motion transfer assembly 27 is given a 'reverse incentive' to rotate and lower the gear ratio. Thus, rotational speed is actually increased at the output gear 24, the gear ratio between the input gear 22 and output gear 24 is increased, and the sensitivity of the middle motion transfer assembly toward beginning planetary motion in the face of "some resistance" at the output gear is lowered. Accordingly, the effective range of gear ratios achievable between the input and output gear 24 increased, such that more than just "a little resistance" at the output gear is required before planetary motion is initiated to lower the effective gear ratio between the input and output gears 22, 24.

Note that the system may grow modularly by the additional of further variance control gear sets 50. In addition, auxiliary variance control gears 70 may be employed to engage the analogous variance gear 26A of the variance control gear set 50 to further tune the "sensitivity" toward changing gear ratios between the input gear 22 and output gear 24 of the input/output gear set 20.

In conclusion, herein is provided a system for automatically achieving an idealized gear ratio, by lowering the overall gear ratio between a rotary drive source and an output load to maintain motion at the output load when resistance is encountered thereat. The invention is illustrated by example in the foregoing description and in the accompanying drawings. Numerous variations, however, are possible while adhering to the invention concept. Such variations are contemplated as being a part of the present invention.

What is claimed is:

1. A device for transmitting power from a rotary drive source to a driven load and automatically changing gear ratio therebetween in response to resistance at the driven load, comprising an input/output gear set having a central axis and further comprising:

an input gear, mounted coaxial with the central axis, the input gear for being driven by the rotary drive source;

an output gear, mounted coaxially with the central axis, for driving the driven load;

an upper motion transfer gear, mounted coaxial with the central axis and shaft linked to the input gear for rotation therewith;

a lower motion transfer gear, mounted coaxial with the central axis and shaft linked to the output gear for rotation therewith;

a variance gear, mounted coaxial with the central axis but not linked with either the input or output gear along said central axis, an upper variance determining gear located on a variance determining axis located on the variance gear radially outwardly from the central axis, the upper variance determining gear in mesh with the upper motion transfer gear;

a lower variance determining gear located on the variance determining axis and shaft linked thereon to the upper variance gear for rotation with the upper variance determining gear, the lower variance determining gear in mesh with the lower motion transfer gear;

wherein during typical operation the input gear shaft drives the upper motion transfer gear, the upper motion transfer gear mesh drives the upper variance determining gear, the upper variance determining gear shaft drives the lower variance determining gear, the lower variance determining gear mesh drives the lower motion transfer gear, and the lower motion transfer gear shaft drives the output gear and thereby drives the driven load; and wherein when resistance to rotation is presented to the output gear by the driven load the lower variance determining gear begins forward planetary motion around the central axis whereby the lower variance gear revolves in mesh around the lower motion transfer gear and thereby begins rotation of the variance gear in the same direction as the output gear, the lower variance gear still rotating the lower motion transfer gear but at a slower speed than in typical operation, to lower the effective gear ratio between the input and output gear such that the output gear rotates slower and with more torque than during typical operation.

2. The device for transmitting power as recited in claim 1, further comprising an auxiliary variance control gear, for externally controlling the rotation of the variance control gear to alter the tendency of the lower motion transfer gear to begin forward planetary motion around the central axis.

3. The device for transmitting power as recited in claim 1, wherein the gear ratio between the upper motion transfer gear and the upper variance determining gear is substantially the same as the gear ratio between the lower variance determining gear and the lower motion transfer gear.

4. The device for transmitting power as recited in claim 3, wherein the input/output gear set further comprises a middle motion transfer assembly, which includes the variance gear, the upper variance determining gear, and the lower variance determining gear as recited, and further has a transfer plate mounted coaxially with the variance gear; wherein the upper variance determining gear and lower variance determining gear are mounted on a variance determining shaft extending between the variance gear and the transfer plate, the variance determining shaft extending parallel to the central axis; and wherein the middle motion transfer assembly rotates around the central axis when the lower variance determining gear orbits around the lower motion transfer gear.

5. The device for transmitting power as recited in claim 1, further comprising a variance control gear set, having a substantially identical structure as the input/output gear set, except wherein the variance control gear set has:

a speed gear, the speed gear rotated by the output gear of the input/output gear set;

a variance control gear, the variance control gear connected to rotate the variance gear of the input/output gear set in the opposite direction as the output gear of the input/output gear set to cause reverse planetary motion of the lower variance determining gear of the input/output gear set to increase the rotational speed of the output gear of the input/output gear set and increase the resistance necessary for the lower variance determining gear of the input/output gear set to begin forward planetary motion that would lower the gear ratio between the input and output gear of the input/output gear set.

6. The device for transmitting power as recited in claim 5, wherein the gear ratio between the upper motion transfer gear and the upper variance determining gear of the input/output gear set is substantially the same as the gear ratio between the lower variance determining gear and the lower motion transfer gear of the input/output gear set.

7. The device for transmitting power as recited in claim 6, wherein the variance control gear set has its own variance gear; wherein the device further comprises an auxiliary variance control gear, for externally controlling the rotation of the variance gear of the variance control gear set to further alter the tendency of the device to lower the gear ratio between the input gear and output gear of the input/output gear set resulting from forward Planetary motion of the lower variance determining gear around the lower motion transfer gear of the input/output gear set.

8. The device for transmitting power as recited in claim 7, wherein the input/output gear set further comprises a middle motion transfer assembly, which includes the variance gear, the upper variance determining gear, and the lower variance determining gear as recited, and further has a transfer plate mounted coaxially with the variance gear; wherein the upper variance determining gear and lower variance determining gear are mounted on a variance determining shaft extending between the variance gear and the transfer plate, the variance determining shaft extending parallel to the central axis; and wherein the middle motion transfer assembly rotates around the central axis when the lower variance determining gear orbits around the lower motion transfer gear.

\* \* \* \* \*